United States Patent
Binek et al.

(10) Patent No.: US 11,713,695 B2
(45) Date of Patent: Aug. 1, 2023

(54) UNITIZED MANUFACTURING OF A GAS TURBINE ENGINE

(71) Applicant: Raytheon Technologies Corporation, Farmington, CT (US)

(72) Inventors: Lawrence A. Binek, Glastonbury, CT (US); David W. Morganson, Marlborough, CT (US); Jesse R. Boyer, Middletown, CT (US)

(*) Notice: Subject to any disclaimer, the term of this patent is extended or adjusted under 35 U.S.C. 154(b) by 295 days.

(21) Appl. No.: 16/871,839

(22) Filed: May 11, 2020

(65) Prior Publication Data

US 2021/0348526 A1 Nov. 11, 2021

(51) Int. Cl.
*F01D 25/28* (2006.01)
*F01D 25/24* (2006.01)

(52) U.S. Cl.
CPC .......... *F01D 25/285* (2013.01); *F01D 25/24* (2013.01); *F01D 25/243* (2013.01); *F01D 25/246* (2013.01); *F05D 2230/60* (2013.01); *F05D 2230/64* (2013.01); *F05D 2230/68* (2013.01)

(58) Field of Classification Search
CPC .......... F01D 25/28; F01D 25/30; F01D 25/24; F01D 25/243; F01D 25/265; F16L 37/12; F16L 37/107; F16L 37/24; F16L 37/248
See application file for complete search history.

(56) References Cited

U.S. PATENT DOCUMENTS

| | | | | |
|---|---|---|---|---|
| 2,809,057 A | * | 10/1957 | McEachern | F16L 27/1004 285/261 |
| 2,877,623 A | * | 3/1959 | Klompas | F01D 25/243 60/39.5 |
| 6,866,478 B2 | | 3/2005 | Fabian et al. | |
| 9,382,814 B2 | * | 7/2016 | Bunel | F16L 37/101 |
| 9,796,486 B1 | | 10/2017 | Illsley et al. | |

FOREIGN PATENT DOCUMENTS

| CN | 108590859 A | 9/2018 |
|---|---|---|
| EP | 3244016 A2 | 11/2017 |
| GB | 2571802 A | 9/2019 |

OTHER PUBLICATIONS

Translation of CN108590859, retrieved Jun. 27, 2022 (Year: 2022).*
Extended European Search Report for EP Application No. 21173150.0, dated Sep. 23, 2021, 8 pages.

* cited by examiner

*Primary Examiner* — Topaz L. Elliott
*Assistant Examiner* — Cameron A Corday
(74) *Attorney, Agent, or Firm* — Getz Balich LLC (57) ABSTRACT

A unitized build assembly for a gas turbine engine includes an exhaust duct, a hot section with a locking structure and including a combustor and turbine section. The hot section at least partially circumferentially surrounds the exhaust duct. The build assembly includes a compressor section with an interface structure and is proximal to the hot section. The hot section at least partially circumferentially surrounds at least part of the compressor section and the locking structure is configured to engage the interface structure to limit movement of the hot section relative to the compressor section.

12 Claims, 5 Drawing Sheets

UNITIZED MANUFACTURING OF A GAS TURBINE ENGINE

BACKGROUND

The present disclosure relates generally to gas turbine engines. More specifically, this disclosure relates to manufacturing of parts of a gas turbine engine.

Attritable aircraft can be particularly suited toward unitized manufacturing and can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary or can be simplified for attritable aircraft applications.

For example, non-rotative parts of a traditional aircraft engine are built in segments and assembled later. This can add significant build and assembly time to the manufacturing process. Additionally, the use of multiple and/or complex fasteners during assembly can also add time and labor to the manufacturing process. There exist needs in various industries to reduce the number of manufactured parts and reduce the overall assembly time, thereby reducing manufacturing costs.

SUMMARY

A unitized build assembly for a gas turbine engine includes an exhaust duct, a hot section with a locking structure and including a combustor and turbine section. The hot section at least partially circumferentially surrounds the exhaust duct. The build assembly includes a compressor section with an interface structure and is proximal to the hot section. The hot section at least partially circumferentially surrounds at least part of the compressor section and the locking structure is configured to engage the interface structure to limit movement of the hot section relative to the compressor section.

A method of manufacturing and assembly of a unitized build assembly including an exhaust duct, a hot section, and a compressor section for a gas turbine engine includes manufacturing the exhaust duct and manufacturing the hot section with a locking structure. The hot section includes a combustor and a turbine section and at least partially circumferentially surrounds the exhaust duct. The method includes manufacturing the compressor section with an interface structure. The compressor section is proximal to the hot section and at least partially circumferentially surrounds at least part of the compressor section. The locking structure is configured to engage the interface structure to limit movement of the hot section relative to the compressor section.

DETAILED DESCRIPTION

A gas turbine engine with a unitized build assembly of the non-rotative sections is disclosed herein. In one example, attritable gas turbine engines in attritable aircraft can leverage additive manufacturing techniques to improve various aspects of the attritable gas turbine engine. Additive manufacturing allows the assembly details to be unitized and, simultaneously permits integration of many complex performance-enhancing features. The additively manufactured engine reduces the time to delivery to the customer and lowers the overall production costs of the unit.

A gas turbine engine with a unitized build can be assembled into place with reduced or without any secondary operations such as the use of traditional fasteners or brazing operations. In other words, major sections such as the compressor section, hot section, and exhaust duct can be manufactured together and then assembled. Assembly can be done in a self-aligning and self-locking process reducing assembly time and the use of additional parts. In one example, the compressor section can be pulled axially away from the hot section, rotated, and locked into place after the build process is complete. This also decouples the axial length of the design build from the size of the build chamber. For example, in additive manufacturing the size of the build is limited by the size of the build chamber and the larger chambers are more expensive to own and operate. Generally, the larger the engine being manufactured the larger the tooling equipment needed for manufacture, increasing the cost of the tooling including additive manufacturing apparatuses. Additionally, larger engines can be more expensive to ship from the site of manufacture to an end user. For example, additive manufacturing builds up the unitized gas turbine engine assembly in a layer by layer process. As such, reducing the axial length of the attritable engine during manufacture, decreases the overall build time, reducing costs. Furthermore, the gas turbine engine prior to assembly has a smaller footprint and is easier and less expensive to ship and store.

Figure 1A:
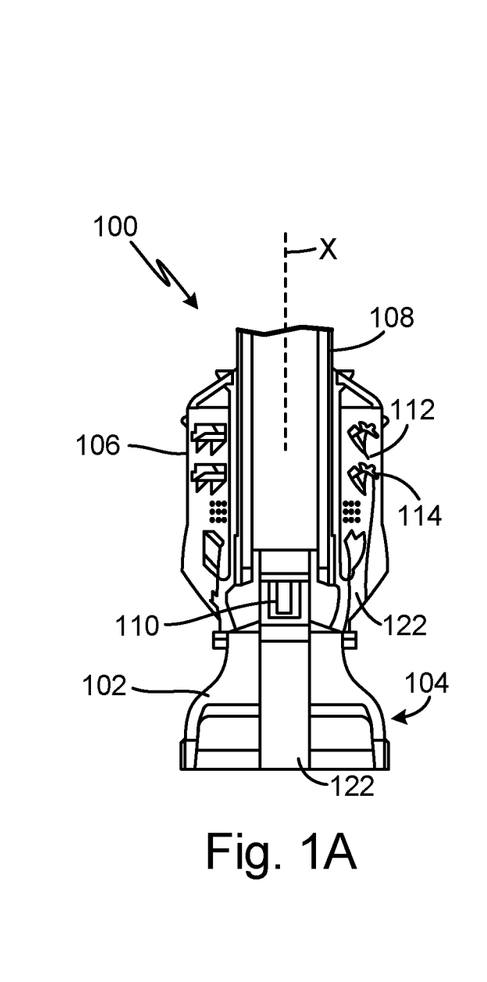
FIGS. 1A-1C are cross-sectional views of a build assembly for a gas turbine engine in a nested, rotated and locked, and an expanded state, respectively.
Figure 1B:
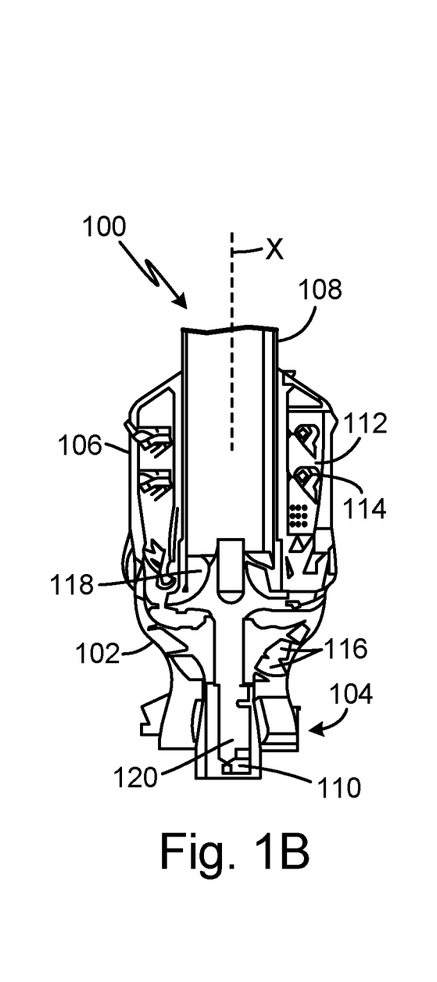
Figure 1C:
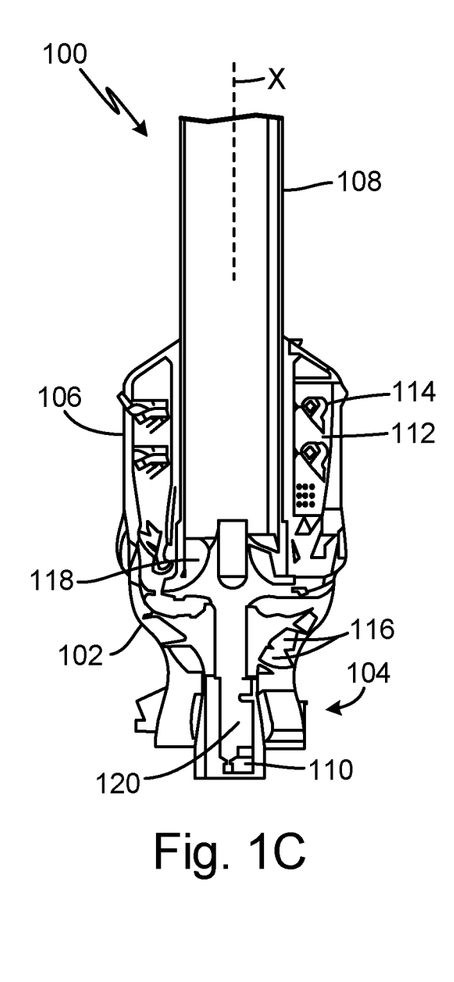

FIGS. 1A-1C are cross-sectional views of a build assembly for an attritable engine in a nested, rotated and locked, and an expanded state, respectively. FIGS. 1A-1C will be discussed together. FIGS. 1A-1C show gas turbine engine 100 including forward engine casing 102, compressor section 104, hot section 106, exhaust duct 108, forward rotor housing 110, combustor 112, dilution chutes 114, compressor blades 116, turbine blades 118, rotor 120, support structures 122, and rotational axis X. Forward engine casing 102 encases compressor section 104 of gas turbine engine 100 and is connected to hot section 106, which encases combustor 112 and turbine blades 118 of gas turbine engine 100. Exhaust duct 108 is connected to hot section 106, opposing forward engine casing 102.

FIG. 1A shows one embodiment of a unitized build assembly of the non-rotative parts of a gas turbine engine. Forward engine casing 102 encases compressor section 104 and forward rotor housing 110, which is positioned adjacent to hot section 106 during the build process. Hot section 106 encases a turbine section and combustor 112, which has dilution chutes 114. Exhaust duct 108 is attached to an interior wall of hot section 106. Compressor section 104, hot section 106, and exhaust duct 108 each circumferentially surround rotational axis X.

During the manufacturing process support structures 122 can be formed to help with the build process. For example, additive manufacturing can be used to form the unitized build gas turbine engine 100 shown in FIG. 1A. Support structures 122 help to provide support to structures built on top of them. During the build process hot section 106 can at least partially circumferentially surround compressor section 104 and exhaust duct 108 as shown in FIG. 1A. For example, part of forward rotor housing 110 is circumferentially surrounded by hot section 106 and forward rotor housing 110 extends into exhaust duct 108 during the build process.

FIG. 1B shows gas turbine engine 100 with support structures 122 removed and rotative parts added including compressor blades 116, turbine blades 118, and rotor 120. Support structures 122 can be formed of partially densified build powder and can be removed using subtractive manufacturing techniques, such as grinding, cutting, or other subtractive manufacturing techniques. FIG. 1B shows compressor section 104 rotated relative to hot section 106 compared to FIG. 1A such that forward rotor housing 110 is positioned axially away, that is axially displaced from, hot section 106 along rotational axis X and forward rotor housing 110 is no longer circumferentially surrounded by hot section 106.

Compressor blades 116 and turbine blades 118 are attached to rotor 120, which is then journaled in bearings within compressor section 104. Compressor blades 116 are encased in compressor section 104 and turbine blades 118 are encased in hot section 106. Compressor section 104 can then be affixed to hot section 106.

FIG. 1C shows exhaust duct 108 in an extended state. Gas turbine engine 100 has a longer axial length along rotational axis X in FIG. 1C compared to FIG. 1B and gas turbine engine 100 has a longer axial length along rotational axis X in FIG. 1B compared to FIG. 1A. Operationally, air enters the forward end of compressor section 104 of assembled gas turbine engine 100 shown in FIG. 1C and is compressed by compressor blades 116. Compressed air and fuel enter combustor 112 where the compressed air and fuel are mixed and ignited. The resulting high-temperature gas from combustor 112 enters a turbine section and drives the rotation of turbine blades 118, which in turn generates power by turning rotor 120 circumferentially about rotational axis X. Gas exits the engine out of the aft end of exhaust section 108.

As shown in FIG. 1A, during the build process compressor section 104, hot section 106, and exhaust duct 108 are nested. For example, the compressor section 104, hot section 106, and/or exhaust duct 108 at least partially overlap during the build process. As such, the axial length of gas turbine engine 100 along rotational axis X in FIG. 1A is shorter during the build process compared to assembled gas turbine engine 100 shown in FIG. 1C.

In one embodiment, the total axial length of attritable engine 100 is 11 inches (27.9 cm) in the nested state and 21 inches (53.3 cm) in an extended state. In other embodiments, the total axial length of attritable engine 100 is from 8 inches (20.3 cm) to 14 inches (35.6 cm), inclusive in the nested state and from 18 inches (45.7 cm) to 24 inches (61 cm), inclusive in an extended state. In other embodiments, the total axial length of attritable engine 100 is less than 8 inches (20.3 cm) in the nested state and less than 18 inches (45.7 cm) in an extended state. In other embodiments, the total axial length of attritable engine 100 is more than 14 inches (35.6 cm) in the nested state and more than 24 inches (61 cm) in an extended state.

Figure 2:
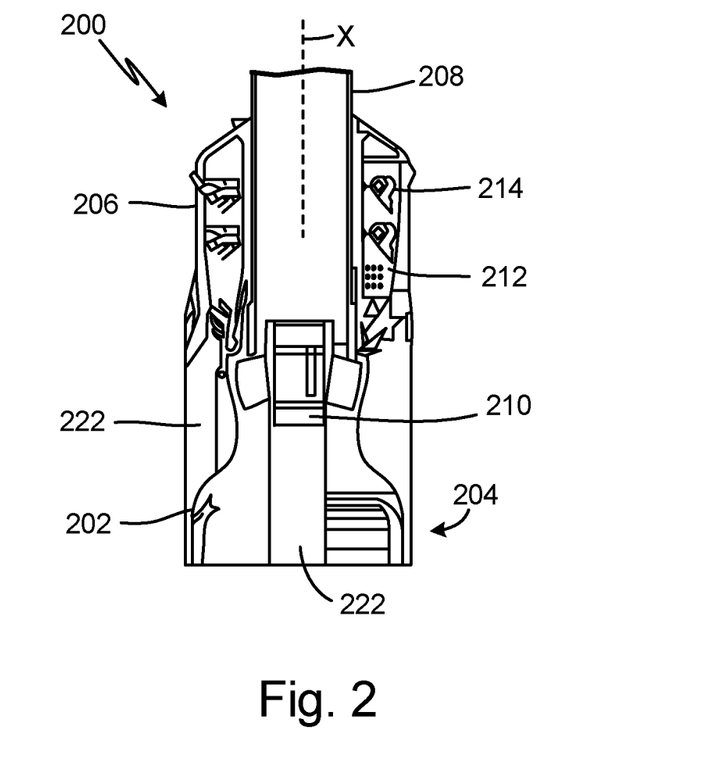
FIG. 2 is a cross-sectional view of one embodiment of the nested build assembly.

FIG. 2 is a cross-sectional view of one embodiment of the unitized build assembly. FIG. 2 shows gas turbine engine 200 including forward engine casing 202, compressor section 204, hot section 206, exhaust duct 208, forward rotor housing 210, combustor 212, dilution chutes 214, support structures 222, and rotational axis X. The descriptions regarding parts with the same names as those in FIGS. 1A-1C are substantially the same except for support structures 222. As shown in FIG. 2, support structures 222 can extend axially along and parallel to rotational axis X from compressor section 204 to hot section 206. Alternatively, as shown in FIG. 1A, support structures 122 can extend axially along and at a 45° or greater angle relative to rotational axis X. Advantageously, less material is used to form support structures 122 and subsequently less material is removed by subtractive manufacturing techniques in FIG. 1A compared to support structures 222 in FIG. 2.

Figure 3A:
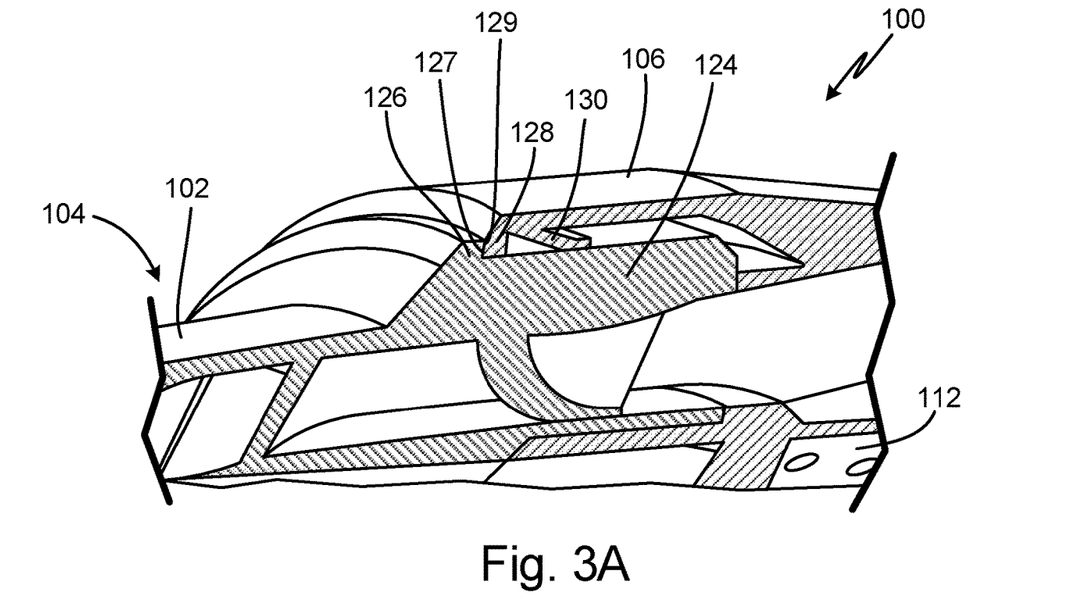
FIG. 3A is a cross-sectional view of one embodiment of a locking spring.
Figure 3B:
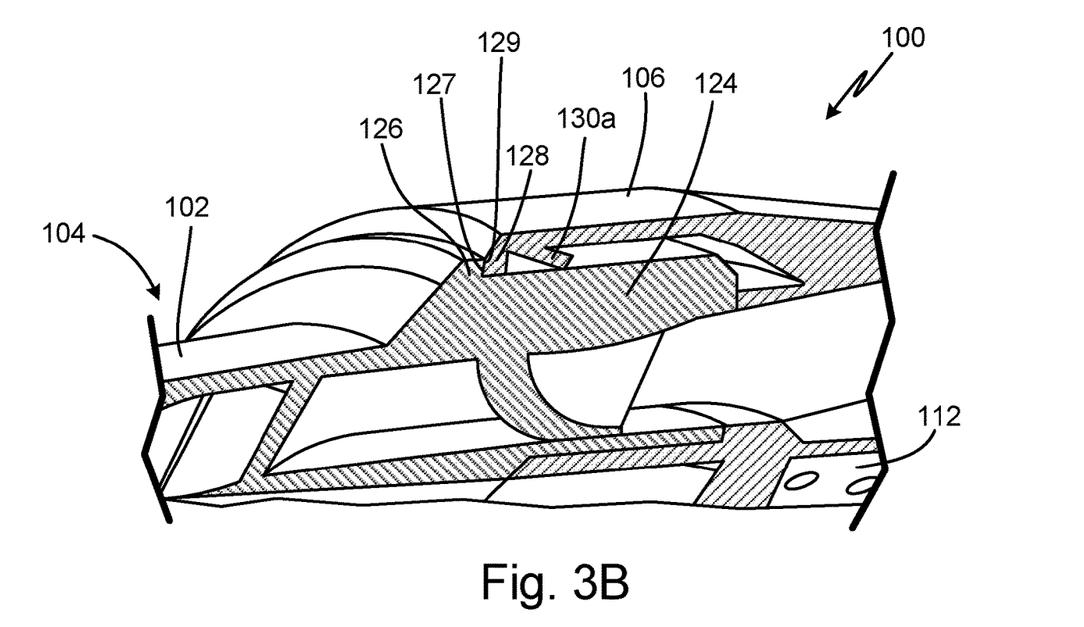
FIG. 3B is a cross-sectional view of another embodiment of a locking spring.
Figure 3C:
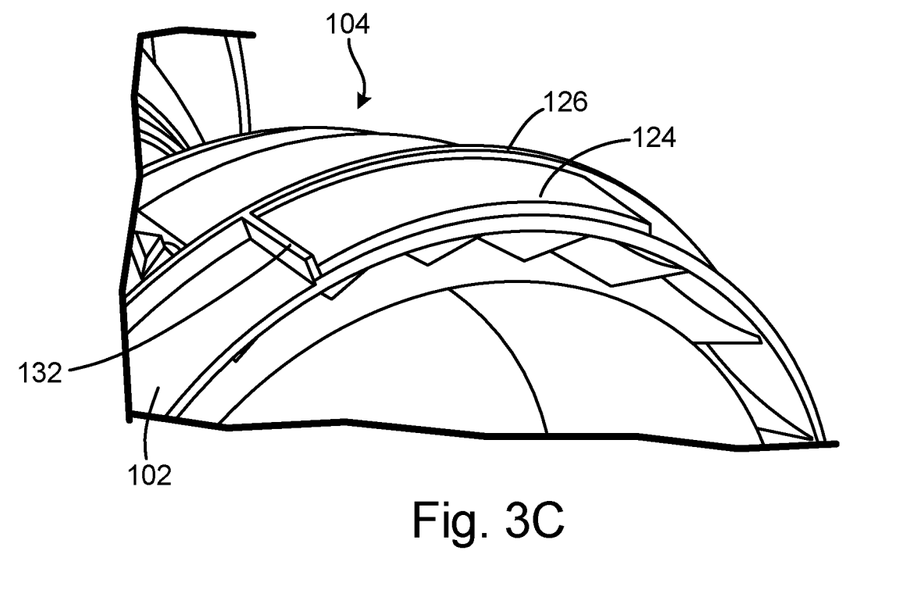
FIG. 3C is a perspective view of one embodiment of a compressor section with an arresting plate and a stop tab.

FIG. 3A is a cross-sectional view of one embodiment of gas turbine engine 100 with locking spring 130. FIG. 3B is a cross-sectional view of another embodiment of gas turbine engine 100 with locking spring 130a. FIG. 3C is a perspective view of one embodiment of compressor section 104 with arresting plate 124 and stop tab 132. FIGS. 3A-3C will be discussed together. FIGS. 3A-3C show part of gas turbine engine 100 including forward engine casing 102, compressor section 104, hot section 106, arresting plate 124, flange 126, flange surface 127, flange 128, flange surface 129, locking spring 130 and 130a, and stop tab 132. Forward engine casing 102 has arresting plate 124 extending from flange 126 and stop tab 132 extending from arresting plate 124. Arresting plate 124 extends both radially away from rotational axis X and axially along rotational axis X. Arresting plate 124 can partially extend circumferentially around rotational axis X. Arresting plate 124 is configured to provide a surface for a locking spring to secure hot section 106 to forward engine casing 102. Flange 126 can extend circumferentially all the way around forward engine casing 102 and extends radially away from rotational axis X. Flange surface 127 faces hot section 106 and provides a mating surface for flange surface 129. Stop tab 132 extends radially outward away from rotational axis X and axially parallel to rotational axis X.

Hot section 106 includes flange 128 and locking spring 130 or 130a. Flange 128 can extend circumferentially all the way around rotational axis X and extends radially inward toward rotational axis X. Flange surface 129 faces compressor section 104 and provides a mating surface for flange surface 127. Locking spring 130 or 130a can partially extend circumferentially around rotational axis X and extend radially inward at an acute angle between 15° and 90° toward rotational axis X and toward the aft end of exhaust duct 108. In some embodiments, locking spring 130 or 130a can be referred to as a pawl, which is spring loaded due to material flexing.

As shown in FIG. 3A, locking spring 130 extends along arresting plate 124 a short distance compared to locking spring 130a. In contrast, as shown in FIG. 3B, locking spring 130a has an angled point that makes contact with arresting plate 124 compared to locking spring 130. Locking spring 130a prevents compressor section 104 from sliding away from hot section 106 more effectively compared to locking spring 130.

In one embodiment, locking spring 130 or 130a can have a width from 0.01 inches (0.254 mm) to 0.05 inches (1.27 mm), inclusive. In other embodiments, locking spring 130 or 130a have a width larger than 0.05 inches (1.27 mm). In one embodiment, locking spring 130 or 130a can have a length from 0.005 inches (0.127 mm) to 1.0 inches (25.4 mm), inclusive.

Locking springs 130 or 130a can have many different geometries and configurations. Some of the factors considered when designing locking springs 130 or 130a include, but are not limited to, the size of the engine, the resistive force necessary to retain compressor section 104 attached to hot section 106 during operation of gas turbine engine 100, the dimensions required to withstand the resistive forces such that locking springs 130 or 130a do not break, the radial distance between compressor section 104 and hot section 106, the ability of locking springs 130 or 130a to slide into place during the assembly process, the number of assembly and disassembly iterations will be performed during the lifetime of the engine, and other forces experienced during operation of the engine such as, vibrations and thermal stress.

Although FIGS. 3A-3C show one locking spring 130 or 130a and one arresting plate 124, each gas turbine engine 100 can have more than one pair of locking spring 130 or 130a and arresting plate 124 interactions. Each pair of locking spring 130 or 130a and arresting plate 124 interaction are preferably symmetrically placed circumferentially around rotational axis X for an even weight distribution to reduce or minimize vibrations during operation of gas turbine engine 100.

Operationally, the assembly process begins by removing support structures 122 from the unitized build, pulling compressor section 104 away from hot section 106 axially along rotational axis X, and rotating compressor section 104 relative to hot section 106 around rotational axis X such that forward rotor housing 110 is positioned axially away from hot section 106 along rotational axis X. The rotating parts, including compressor blades 116, turbine blades 118, and rotor 120, are then assembled into place.

Compressor section 104 and hot section 106 are aligned such that arresting plate 124 and locking spring 130 or 130a remain spaced apart as compressor section 104 and hot section 106 are pushed together. Flange 126 of compressor section 104 and flange 128 of hot section 106 provide flange surfaces 127 and 129, respectively. When flange surfaces 127 and 129 engage one another, a user is able to detect when flange 126 is in contact with flange 128 and allow the user to know when compressor section 104 and hot section 106 are in a desired axial position relative to one another.

Once flange 126 is in contact with flange 128, compressor section 104 is rotated relative to hot section 106 until locking spring 130 or 130a engages stop tab 132, which allows a user to know when locking spring 130 or 130a has made contact with stop tab 132. During rotation, locking spring 130 or 130a engages arresting plate 124. When locking spring 130 or 130a is engaged with arresting plate 124, locking spring 130 or 130a resists movement by compressor section 104 away from hot section 106 in the axial direction. For example, gas turbine engine 100 can experience vibrational and thermal stress under load and locking spring 130 or 130a prevents movement of compressor section 104 away from hot section 106 in the axial direction during operation of gas turbine engine 100.

In one embodiment, once locking spring 130 or 130a is engaged with arresting plate 124, compressor section 104 cannot be detached from hot section 106 without breaking or damaging locking spring 130 or 130a, arresting plate 124, or both. In other embodiments, once locking spring 130 or 130a is engaged with arresting plate 124, compressor section 104 can be detached from hot section 106 without breaking or damaging locking spring 130 or 130a, arresting plate 124, or both.

Advantageously, assembly of gas turbine engine 100 is accomplished without the use of tooling traditionally used for forming permanent joints such as, for example, welding, soldering, or brazing and without conventional fasteners such as, for example, bolts, clamps, clasps, clips, latches, or pins. Although FIGS. 3A-3C show one embodiment of an engagement structure between a locking structure (locking spring 130 or 130a) and an interface structure (arresting plate 124), other engagement structure can also be used such as, for example, a rotative spline or quarter turn attachment. For a rotative spline, the locking structures are the ridges or teeth on a shaft and the interface structure are the grooves in a mating piece. For a quarter turn attachment, a locking structure is a spring and the interface structure is a slot on a button.

Gas turbine engine 100 can be additively manufactured using techniques such as laser powder bed fusion, electron beam melting, direct energy deposition, and binder jetting. The additive manufacturing process can use any metal or alloy that can tolerate the high temperature and pressure environment of a gas turbine engine for the expected useable life of the vehicle, such as, for example, Inconel® 625 or other nickel alloys including alloys of nickel, chromium, and iron. However, guided munitions, missiles, and decoys are designed as single-use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the gas turbine engine.

Example

Figure 4A:
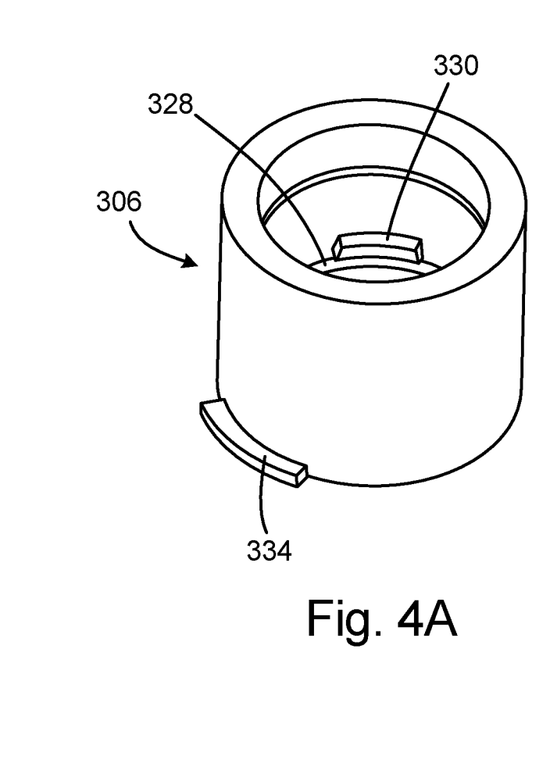
FIG. 4A is a perspective view of a partially built hot section with a locking spring.
Figure 4B:
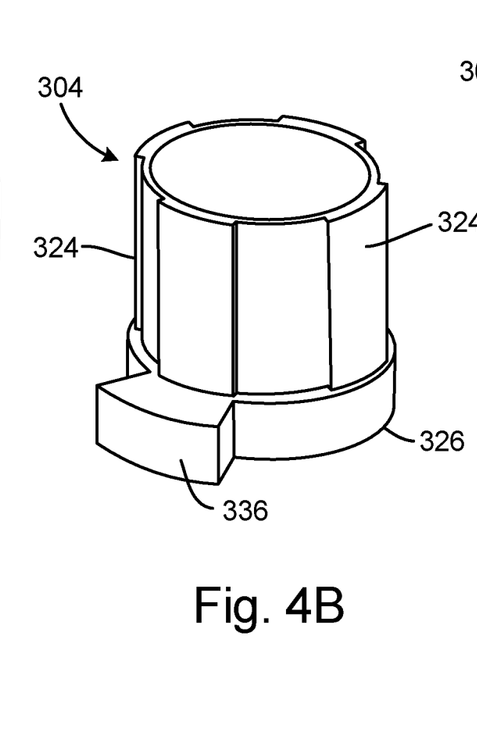
FIG. 4B is a perspective view of a partially built compressor section with arresting plates.
Figure 4C:
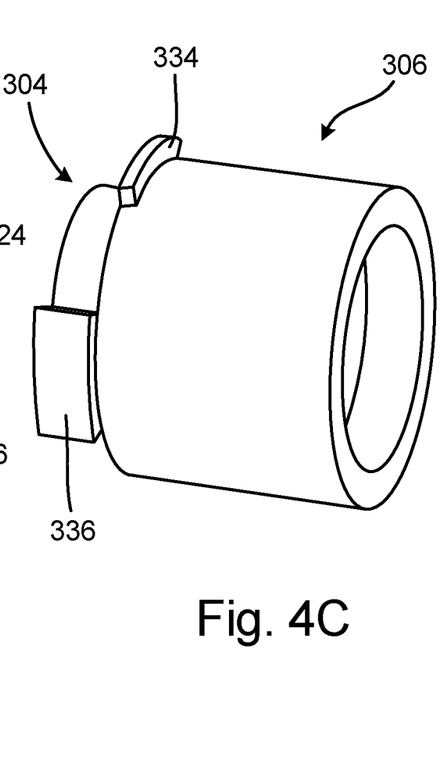
FIG. 4C is a perspective view of the partially built hot section and partially built compressor sections coupled together in a locked state.

FIG. 4A is a perspective view of partially built hot section 306 with locking spring 330. FIG. 4B is a perspective view of partially built compressor section 304 with arresting plates 324. FIG. 4C is a perspective view of partially built hot section 306 and partially built compressor sections 304 coupled together in a locked state. FIGS. 4A-4C will be discussed together. FIGS. 4A-4C show compressor section 304, hot section 306, arresting plates 324, flange 326, flange 328, locking spring 330, and finger grips 334 and 336.

Partially built compressor section 304 and partially built hot section 306 were manufactured using additive manufacturing techniques. Compressor section 304 has four arresting plates 324 and hot section 306 has four locking springs although only one is viewable in FIG. 4A. Compressor section 304 and hot section 306 are self-aligning. In other words, each locking spring 330 was positioned and was slid in between two arresting plates 324 as compressor section 304 and hot section 306 were pushed together until flanges 326 and 328 made contact with one another. Compressor section 304 and hot section 306 were then rotated relative to one another such that each locking spring 330 engaged with one arresting plate 324. Finger grips 334 and 336 were manufactured to assist a user in manipulating the compressor section 304 and hot section 306 during the assembly process.

Although finger grips 334 and 336 were included in the manufacturing process of partial compressor section 304 and partial hot section 306, finger grips 334 and 336 may not be necessary in completely built compressor section and completely built hot section.

A gas turbine engine manufactured in a unitized build can be assembled into place with fewer or without any secondary operations, which reduces the tooling and time needed to assemble the gas turbine engine after the manufacturing process is complete. The compressor section can be pulled away from the hot section by a user, rotated, and pushed into place. This also decouples the axial length of the design build from the size of the build chamber. Reducing the axial length of the gas turbine engine during manufacture, decreases the overall build time, reducing costs. Furthermore, the gas turbine engine prior to assembly has a smaller footprint and, as such, is easier and less expensive to ship.

Discussion of Possible Embodiments

The following are non-exclusive descriptions of possible embodiments of the present invention.

A unitized build assembly for a gas turbine engine includes an exhaust duct, a hot section with a locking structure and including a combustor and turbine section. The hot section at least partially circumferentially surrounds the exhaust duct. The build assembly includes a compressor section with an interface structure and is proximal to the hot section. The hot section at least partially circumferentially surrounds at least part of the compressor section and the locking structure is configured to engage the interface structure to limit movement of the hot section relative to the compressor section.

The unitized build assembly of the preceding paragraph can optionally include, additionally and/or alternatively, any one or more of the following features, configurations and/or additional components:

The locking structure includes a locking spring.

The interface structure includes an arresting plate.

The arresting plate includes a stop tab configured to stop the hot section from rotating past the stop tab.

At least part of the compressor section includes part of a forward rotor housing.

The locking structure is configured to allow the compressor section to be secured to the hot section by sliding and rotating the hot section and the compressor sections relative to one another.

The locking structure includes a locking spring, the interface structure includes an arresting plate, and the locking spring is configured to allow the compressor section to slide and rotate in a first direction relative to the hot section and resist sliding in a second direction.

The locking structure includes ridges or teeth of a rotative spline, and the interface structure includes grooves in a mating piece of the rotative spline.

The locking structure includes a spring of a quarter turn attachment and the interface structure includes a slot on a button of the quarter turn attachment.

The build assembly is manufactured using additive manufacturing techniques.

A method of manufacturing and assembly of a unitized build assembly including an exhaust duct, a hot section, and a compressor section for a gas turbine engine includes manufacturing the exhaust duct and manufacturing the hot section with a locking structure. The hot section includes a combustor and a turbine section and at least partially circumferentially surrounds the exhaust duct. The method includes manufacturing the compressor section with an interface structure. The compressor section is proximal to the hot section and at least partially circumferentially surrounds at least part of the compressor section. The locking structure is configured to engage the interface structure to limit movement of the hot section relative to the compressor section.

The method of the preceding paragraph can optionally include, additionally and/or alternatively, any one or more of the following features, configurations and/or additional components:

The method further comprising removing support structures from the unitized build assembly.

The at least part of the compressor section includes part of a forward rotor housing.

The method further comprising rotating the compressor section relative to the hot section such that the forward rotor housing is positioned axially away from the hot section.

The method further comprising sliding the compressor section relative to the hot section until a flange of the compressor section engages a flange of the hot section.

The method further comprising rotating the compressor section about a rotational axis relative to the hot section until the locking structure engages a stop tab of the interface structure.

The method further comprising extending the exhaust duct in an axial direction relative to the hot section.

A unitized build assembly for a gas turbine engine includes an exhaust duct, a hot section with a locking spring and including a combustor and turbine section. The hot section at least partially circumferentially surrounds the exhaust duct. The build assembly includes a compressor section with a locking structure with an arresting plate. The hot section at least partially circumferentially surrounds at least part of the compressor section. The locking spring is configured to allow the compressor section to be secured to the hot section by sliding and rotating the sections relative to one another and an arresting plate is configured to limit the compressor section from moving relative to the hot section.

The unitized build assembly of the preceding paragraph can optionally include, additionally and/or alternatively, any one or more of the following features, configurations and/or additional components:

The locking structure includes ridges or teeth of a rotative spline, and the interface structure includes grooves in a mating piece of the rotative spline.

The locking structure includes a spring of a quarter turn attachment, and the interface structure includes a slot on a button of the quarter turn attachment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A unitized build assembly for a gas turbine engine, the unitized build assembly comprising:
   an exhaust duct;
   a hot section with a locking structure, wherein the hot section comprises a combustor and a turbine section, the hot section at least partially circumferentially surrounding the exhaust duct; and
   a compressor section having an interface structure, wherein the compressor section is proximal to the hot section and the hot section at least partially circumferentially surrounds at least part of the compressor section, wherein the locking structure is configured to engage the interface structure to limit movement of the hot section relative to the compressor section;
   wherein the locking structure comprises a locking spring radially outboard of the interface structure, and the locking spring contacts and is spring loaded radially against the interface structure.

2. The unitized build assembly of claim 1, wherein the interface structure includes an arresting plate.

3. The unitized build assembly of claim 2, wherein the arresting plate includes a stop tab configured to stop the hot section from rotating past the stop tab.

4. The unitized build assembly of claim 1, wherein at least part of the compressor section includes part of a forward rotor housing.

5. The unitized build assembly of claim 1, wherein the locking structure is configured to allow the compressor section to be secured to the hot section by sliding and rotating the hot section and the compressor section relative to one another.

6. The unitized build assembly of claim 5, wherein the interface structure includes an arresting plate, and the locking spring is configured to allow the compressor section to slide and rotate in a first direction relative to the hot section and resist sliding in a second direction.

7. The unitized build assembly of claim 1, wherein the locking structure includes ridges or teeth of a rotative spline, and the interface structure includes grooves in a mating piece of the rotative spline.

8. The unitized build assembly of claim 1, wherein the locking spring is a spring of a quarter turn attachment, and the interface structure includes a slot on a button of the quarter turn attachment.

9. The unitized build assembly of claim 1, wherein the build assembly is manufactured using additive manufacturing techniques.

10. A unitized build assembly for a gas turbine engine, the unitized build assembly
    an exhaust duct;
    a hot section including a sidewall, a locking spring, a combustor and a turbine section, the hot section at least partially circumferentially surrounding the exhaust duct; and
    a compressor section having an interface structure with an arresting plate, wherein the locking spring is configured to allow the compressor section to be secured to the hot section by sliding and rotating the sections relative to one another, and wherein an arresting plate is configured to limit the compressor section from moving relative to the hot section;
    wherein the locking spring is formed integral with the sidewall in a unitary body, and the locking spring is radially between the sidewall and the arresting plate.

11. The unitized build assembly of claim 10, wherein the hot section includes ridges or teeth of a rotative spline, and the interface structure includes grooves in a mating piece of the rotative spline.

12. The unitized build assembly of claim 10, wherein the locking spring is a spring of a quarter turn attachment, and the interface structure includes a slot on a button of the quarter turn attachment.

* * * * *